(12) United States Patent
Hagman et al.

(10) Patent No.: US 10,395,797 B2
(45) Date of Patent: Aug. 27, 2019

(54) SELF-SUPPORTING ELECTRIC POWER CABLE AND BUOY ARRANGEMENT (71) Applicant: NKT Cables Group A/S, Brøndby (DK)

(72) Inventors: Lars Ingvar Hagman, Söderbärke (SE); Anders Jonas Gatu, Vikarbyn (SE); Björn Håkan Rickardsson, Falun (SE); Hans Christian Andersson, Falun (SE); Matz Anders Allernäs Mattsson, Borlänge (SE); Lars Efraimsson, Fagerfjäll (SE)

(73) Assignee: NKT Cables Group A/S, Brøndby (DK)

( * ) Notice: Subject to any disclaimer, the term of this patent is extended or adjusted under 35 U.S.C. 154(b) by 0 days.

(21) Appl. No.: 16/093,014

(22) PCT Filed: Mar. 30, 2017

(86) PCT No.: PCT/DK2017/050095
§ 371 (c)(1),
(2) Date: Oct. 11, 2018

(87) PCT Pub. No.: WO2017/178024
PCT Pub. Date: Oct. 19, 2017

(65) Prior Publication Data
US 2019/0172609 A1    Jun. 6, 2019

(30) Foreign Application Priority Data

Apr. 11, 2016   (DK) ................................. 2016 70218

(51) Int. Cl.
*H01B 7/18* (2006.01)
*H01B 7/04* (2006.01)
(Continued)

(52) U.S. Cl.
CPC ........... *H01B 7/1815* (2013.01); *H01B 7/045* (2013.01); *H01B 7/14* (2013.01); *H01B 7/182* (2013.01); *H02G 9/12* (2013.01)

(58) Field of Classification Search
CPC ........ H01B 5/08; H01B 7/1815; H01B 7/045; H01B 7/14; H01B 7/182
See application file for complete search history.

(56) References Cited

U.S. PATENT DOCUMENTS 3,482,034 A    12/1969   Rhoades et al.
4,041,237 A *  8/1977    Stine ........................ H01B 3/44
                                                                   174/10
(Continued)

FOREIGN PATENT DOCUMENTS

EP    2521139 A1    11/2012
SE    1530182 A1    4/2017
(Continued)

OTHER PUBLICATIONS

Danish Search Report Application No. PA 2016 70218 Completed: Nov. 4, 2016 4 pages.
(Continued)

*Primary Examiner* — Timothy J Thompson
*Assistant Examiner* — Amol H Patel
(74) *Attorney, Agent, or Firm* — Whitmyer IP Group LLC (57) ABSTRACT A self-supporting electric power cable is disclosed. The electric power cable includes an outer jacket portion and a core portion. The core portion includes at least one insulated conductor and at least one supporting cord. The at least one insulated conductor includes a number of individual wires, and the at least one supporting cord includes synthetic fibers. The number of individual wires, individually or arranged in bundles, are arranged in a first lay direction. The at least one insulated conductor and the at least one supporting cord are
(Continued)

arranged in a second lay direction. The at least one supporting cord is arranged as a separate unit in a cross sectional sector of the self-supporting electric power cable. Thus flexible and durable power cable for sea use is provided. Also an offshore arrangement is disclosed herein.

20 Claims, 2 Drawing Sheets

(51) Int. Cl.
*H02G 9/12* (2006.01)
*H01B 7/14* (2006.01)

(56) References Cited

U.S. PATENT DOCUMENTS

| | | |
|---|---|---|
| 4,956,523 A | 9/1990 | Pawluk |
| 2007/0000682 A1* | 1/2007 | Varkey ............... H01B 7/046 174/102 R |
| 2007/0044991 A1* | 3/2007 | Varkey ............... H01B 7/046 174/102 R |
| 2007/0044992 A1 | 3/2007 | Bremnes |
| 2014/0060884 A1 | 3/2014 | Patel |
| 2014/0251653 A1* | 9/2014 | Lancaster ............ H01B 5/102 174/128.1 |
| 2015/0170791 A1 | 6/2015 | Varkey et al. |

FOREIGN PATENT DOCUMENTS

| | | |
|---|---|---|
| WO | 2011008620 A2 | 1/2011 |
| WO | 2012005638 A1 | 1/2012 |
| WO | 2012037265 A2 | 3/2012 |

OTHER PUBLICATIONS

International Search Report and Written Opinion of the International Searching Authority Application No. PCT/DK2017/050095 completed: May 11, 2017; dated May 17, 2017 17 pages.
Written Opinion of the International Searching Authority Application No. PA 2016 70218 completed: Nov. 7, 2016 3 pages.

* cited by examiner

007# SELF-SUPPORTING ELECTRIC POWER CABLE AND BUOY ARRANGEMENT

TECHNICAL FIELD

The technical filed relates to a self-supporting electric power cable. The technical field further relates to a buoy arrangement.

BACKGROUND

An electric power cable comprises at least one electrical conductor which is surrounded by an insulating material. An outer jacket portion surrounds the electrical conductor. Further members may be arranged underneath the outer jacket portion, such as an electrical shielding, enforcing wires, etc. Electric power cables are advantageously bendable to a certain extent in order to be handled prior, during, and after installation.

Some electric power cables are suspended between suspension points. Such an electric power cable may be self-supporting, i.e. designed to support forces related to its own weight and also to external forces affecting the self-supporting electric power cable. At least one conductor in an inner portion of the self-supporting electric power cable or at least one messenger wire in the inner portion of the self-supporting electric power cable is designed to bear these forces. A conductor may comprise several wires that are made out of aluminium and/or copper. One solution is therefore to let the conductor itself act as the supporting element. At a suspension point of a self-supporting electric power cable, forces acting on the self-supporting electric power cable are transferred via a suspension arrangement to a carrying structure for the self-supporting electric power cable. Various kinds of suspension arrangements for over-head electric power cables are known. Some kinds of suspension arrangements engage with an exterior surface of the self-supporting electric power cable and thus, the forces have to be transferred between an outer portion comprising the exterior surface and the inner portion of the self-supporting electric power cable. WO 2012/005638 discloses a self-supporting electric power cable comprising an intermediate layer arranged between an outer portion and an inner portion of the self-supporting electric power cable. Relative movement between the inner and outer portions is permitted. At a suspension point, where the self-supporting electric power cable is subjected to radial forces from a suspension arrangement, the intermediate layer provides a frictional engagement between the inner and outer portions, by means of which forces acting along the self-supporting electric power cable may be transferred between the inner and outer portions.

U.S. Pat. No. 4,956,523 discloses an armoured electric cable having integral tensile members made e.g. from steel or aramid fibres to provide additional tensile strength. The tensile members are embedded in an inner PVC jacket which securely grips the central insulated conductors over which it is extruded. The jacket is, in turn, securely gripped by an armour cover formed of a steel strip which is wound helically around the jacket and bites into longitudinal ridges on the jacket. The armour coating has an undulating shape and is covered by an outer PVC jacket which is extruded over it. Thus, in the vertical position much of the weight of the insulated conductors, inner and outer PVC jackets and armour coating can be supported by the tensile members without producing dangerous longitudinal slippage or creepage between them.

US 2007/0044992 discloses a subsea power cable including a conductor encompassed by a layer of high voltage insulation material including inner and outer semiconducting layers. The insulated conductor is encompassed by a number of armouring elements each consisting of polyaramid fibres enclosed within a semi-conductive layer. US 2007/0044992 attempts to solve the problem with squeezing between a pipeline and hard objects during installation of the subsea power cable. Moreover, as the pipeline expands and contracts during operation, the cable is generally subject to stretching and sliding forces against the seabed. These problems are aggravated, if the pipeline spans valleys between reefs or boulders on the seabed. The subsea cable proposed in US 2007/0044992 attempts at least to alleviate these problems.

SUMMARY

It is an object of the present invention to provide an electric power cable suited for use in connection with offshore electric installations.

According to an aspect of the invention, the object is achieved by a self-supporting electric power cable having a length defining a longitudinal direction and comprising an outer jacket portion and a core portion. The outer jacket portion extends along the longitudinal direction and encloses the core portion. The core portion comprises at least one insulated conductor and at least one supporting cord. The at least one insulated conductor comprises a number of individual wires. The at least one supporting cord comprises fibres, preferably selected from synthetic fibres, mineral fibres or any combinations thereof. The number of individual wires, individually or arranged in bundles, are arranged in a first lay direction, and the at least one insulated conductor and the at least one supporting cord are arranged in a second lay direction, the second lay direction being opposite to the first lay direction. The at least one supporting cord is arranged as a separate unit in a cross sectional sector of the self-supporting electric power cable. In other words, the at least one supporting cord is separate from the at least one insulated conductor and both the at least one supporting cord and the at least one insulated conductor are enclosed in the outer jacket.

Since the number of individual wires in the at least one insulated conductor are arranged in the first lay direction, and the at least one insulated conductor and the at least one supporting cord are arranged in the second lay direction, a self-supporting electric power cable is provided, in which tension is mainly taken up by the at least one supporting cord, while the individual wires of the electric conductor are relieved from any substantial tension. Moreover, since the at least one supporting cord is arranged as a separate unit in a cross sectional sector of the self-supporting electric power cable, a flexible self-supporting electric power cable is provided. Thus, a self-supporting electric power cable being able to withstand movements caused by waves with reduced or even without early cable failure due to fatigue is provided. As a result, the above mentioned object is achieved. Also, the use of synthetic fibres in the at least one supporting cord contributes to the flexibility of the self-supporting electric power cable.

Namely, it has been realised by the inventors that connecting an offshore electric installation via a self-supporting electric power cable with a further offshore installation, or land based installation, i.e. wherever a self-supporting electric power cable is subjected to movement by waves of the sea, requires a flexible cable which is able to be subjected to a large number of movements caused by waves.

Some previous attempts of connecting electric installations at sea via an electric power cable have instead focused on reducing the movement of the electric power cable in order to reduce the risk of fatigue, i.e. to provide a comparatively stiff electric power cable. Accordingly, the electric power cable according to the present invention provides a different approach.

Herein the term "enclose" entails a radial enclosure of one or more elongated members or portions of the electric power cable. At its longitudinal ends the elongated members or portions may be exposed, such as e.g. conducting wires for the purpose of connection to electric equipment. The term "lay direction", or "direction of lay", refers to the direction, in which wires/fibres/conductor/cord are twisted. The lay direction may either be a left lay or a right lay, also referred to as left hand lay or right hand lay. Each lay has a lay length, also referred to as pitch, which defines the length along a relevant part for one component of the part to extend one revolution around the part, similar to the pitch of a thread of a screw.

The present invention is based around the use of a first lay direction for the number of individual wires in the at least one insulated conductor, and a second lay direction for the at least one insulated conductor and the at least one supporting cord in the self-supporting electric power cable. The use of the opposite lay directions in this manner ensures that the arrangement of the number of individual wires are lengthened in comparison with the at least one supporting cord. Thus, the at least one supporting cord will be the primary bearer of tension, to which the self-supporting electric power cable is subjected while the number of individual wires are subjected to substantially less load than the at least one supporting cord. The use of a material with relatively low elasticity, such as the synthetic and/or mineral fibres, in the at least one supporting cord ensures that the number of individual wires is subjected to low load even when the self-supporting electric power cable is subjected to high tension.

The term "no lay" or "without lay" means that the element in question is substantially free of twists.

The offshore electric installation may be a floating power generation station, such as e.g. an installation comprising a wave powered electric generator or a wind powered electric generator. The offshore electric installation may be a floating or seabed based hub, such as a transformer hub. The offshore electric installation may comprise a buoy arrangement. The outer jacket portion forms an outermost portion of the self-supporting electric power cable. The outer jacket portion may comprise more than one layer. The at least one insulated conductor and the at least one supporting cord may form separate elongated members of the self-supporting electric cable. The individual wires are electrically conductive elements of the self-supporting electric power cable. The at least one supporting cord being arranged as a separate unit in a cross sectional sector of the self-supporting electric power cable entails that the at least one supporting cord forms a unit, which in a cross section of the self-supporting power cable does not extend outside a sector of the cross section. Moreover, this also entails that the at least one supporting cord preferably is not moulded into any enclosing structure except the outer jacket, but that the at least one supporting cord may adapt its cross sectional shape to the outer jacket portion and the at least one insulated conductor within the self-supporting electric power cable, e.g. during manufacturing of the self-supporting electric power cable, but more importantly for the flexibility of the self-supporting electric power cable, also to some extent during use of the self-supporting electric power cable as it is subjected to movement due to waves of the sea. The number of individual wires, individually or arranged in bundles, being arranged in the first lay direction preferably entails that all individual wires are arranged in the first lay direction in embodiments where the at least one insulated conductor comprises one bundle only, and that at least the bundles are arranged in the first lay direction in embodiments where the at least one insulated conductor comprises at least two bundles. In the latter embodiments, the individual wires of each bundle may be arranged in the first or second lay directions, or extend longitudinally within each bundle.

According to embodiments, the number of individual wires may be arranged in at least two bundles in the at least one insulated conductor. The at least two bundles may be arranged in the first lay direction. In this manner the at least one insulated conductor may be built up of a number of bundles of individual wires. Since the bundles are arranged in the first lay direction, it may be ensured that the individual wires of the at least one insulated conductor are relieved of tension as the at least one insulated conductor and the at least one supporting cord are arranged along the second lay direction in the self-supporting electric power cable. A "bundle" is sometimes also referred to as a "strand".

According to alternative embodiments, the number of individual wires may be arranged in one bundle only in the at least one insulated conductor, the number of individual wires being arranged in the first lay direction. Since the individual wires are arranged in the first lay direction, is may be ensured that the individual wires of the at least one insulated conductor are relieved of tension as the at least one insulated conductor and the at least one supporting cord are arranged along the second lay direction in the self-supporting electric power cable.

According to embodiments, the at least one insulated conductor may comprise a centrally arranged bundle of synthetic and/or mineral fibres arranged in the middle of at least some of the number of individual wires, i.e. the individual wires are arranged to surround the centrally bundle of synthetic and/or mineral fibres. In this manner the at least one insulated conductor may be reinforced at its centre by the centrally arranged bundle of synthetic and/or mineral fibres. The tension on the individual wires of the insulated conductor is further relieved by the at least one insulated conductor and the at least one supporting cord arranged along the second lay direction in the self-supporting electric power cable.

In an aspect of the present invention it is further an object to provide an offshore arrangement comprising a self-supporting electric power cable subjected to movement caused by waves, which offshore arrangement will maintain its electrical connection via the self-supporting electric power cable over time.

According to an aspect of the invention, the object is achieved by an offshore arrangement comprising a movable body, a suspension arrangement for a self-supporting electric power cable, and a self-supporting electric power cable according to any one aspect and/or embodiment discussed herein.

Since the offshore arrangement comprises a self-supporting electric power cable according to any aspect and/or embodiment discussed herein, the self-supporting electric power cable is flexible and resistant to fatigue. Accordingly, the above mentioned object is achieved.

Further features of, and advantages of embodiments of the present invention will become apparent from the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Preferred embodiments of the present invention will now be described more fully. Like numbers refer to like elements throughout. Well-known functions or constructions will not necessarily be described in detail for brevity and/or clarity.

Figure 1A:
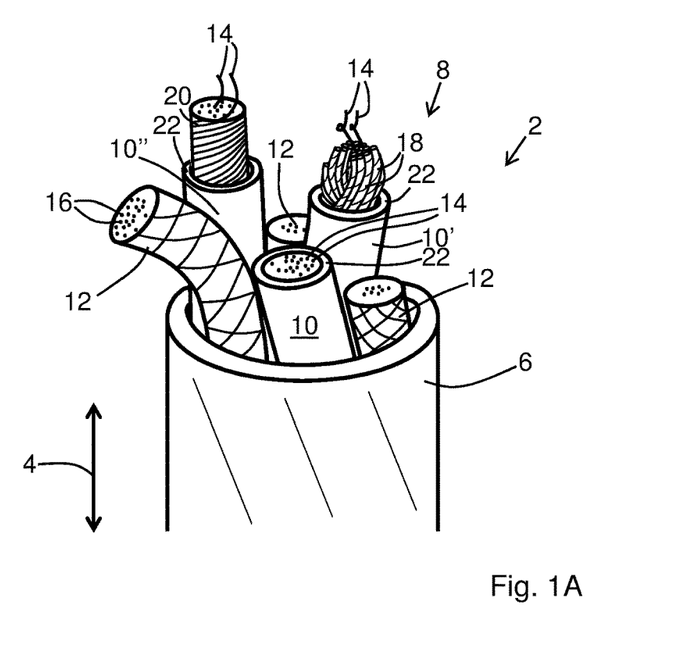
FIGS. 1A and 1B schematically illustrate a self-supporting electric power cable according to embodiments, FIG. 2 schematically illustrates a cross section through an insulated conductor according to embodiments, FIG. 3 schematically illustrates a buoy arrangement according to embodiments, and FIG. 4A-4C schematically illustrate conductors and supporting cords.
Figure 1B:
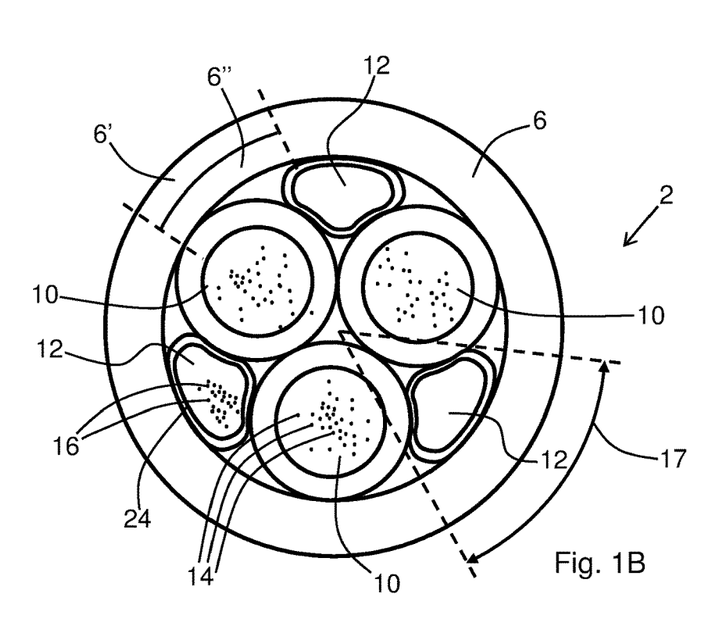

FIGS. 1A and 1B schematically illustrate a self-supporting electric power cable 2 according to embodiments. FIG. 1A illustrates a partial exploded view of the self-supporting electric power cable 2. FIG. 1B illustrates a cross section through the self-supporting electric power cable 2. Herein the self-supporting electric power cable 2 may alternatively be referred to as the cable 2, or the power cable 2.

The self-supporting electric power cable 2 extends along a longitudinal direction 4 and comprises an outer jacket portion 6 and a core portion 8. The outer jacket portion 6 extends along the longitudinal direction 4 and encloses the core portion 8. The core portion 8 comprises at least one insulated conductor 10 and at least one supporting cord 12. The at least one insulated conductor 10 comprises a number of individual wires 14.

The at least one supporting cord 12 comprises synthetic fibres 16. The fibres could in an alternative embodiment be mineral fibres or a combination of fibres comprising mineral and/or synthetic fibres. Suitable mineral fibres are for example glass fibres and/or basalt fibres. The number of individual wires 14 may be arranged in a first lay direction, such as a right lay as illustrated in FIG. 1A. The synthetic fibres 16 may extend longitudinally along the supporting cord 12 or may be arranged in a second lay direction, such as a left lay. The at least one insulated conductor 10 and the at least one supporting cord 12 are arranged along the second lay direction, i.e. a left lay in the embodiments illustrated in FIG. 1A.

The synthetic fibres 16 either extend longitudinally along the at least one supporting cord 12, or are arranged in a second lay direction, in the readily manufactured electric power cable 2. Accordingly, in the readily manufactured electric power cable 2 the synthetic fibres 16 are not arranged in the first lay direction. The synthetic fibres 16 extending longitudinally along the at least one supporting cord 12 entail that the synthetic fibres 16 are arranged neither in the first nor in the second lay direction. Prior to arranging the at least one insulated conductor 10 and the at least one supporting cord 12 in the second lay direction, the synthetic fibres 16 in the at least one supporting cord 12 may be arranged in the first lay direction, as long as the lay length of the synthetic fibres 16 is such that the synthetic fibres 16 extend longitudinally along the at least one supporting cord 12, or are arranged in a second lay direction, after the at least one insulated conductor 10 and the at least one supporting cord 12 are arranged in the second lay direction.

The synthetic fibres 16 may e.g. comprise aramid fibres, sold inter alia under the name Kevlar™, and/or Ultra-high-molecular-weight polyethylene, UHMWPE, UHMW, also known as high-modulus polyethylene, HMPE, or high-performance polyethylene HPPE, sold inter alia under the name Dyneema™, and/or Poly Vinyl Alcohol, PVOH, PVA, PVAl.

As shown in FIG. 1B, the at least one supporting cord 12 is arranged as a separate unit in a cross sectional sector 17 of the self-supporting electric power cable 2. The at least one supporting cord 12 is arranged underneath the outer jacket portion 6. The at least one supporting cord 12 abuts against the outer jacket portion 6 and against the at least one insulated conductor 10.

By laying the at least one insulated conductor 10 with the number of individual wires 14 having a first lay direction with the at least one supporting cord 12 in the second lay direction, the number of individual wires 14 is lengthened in comparison with the at least one supporting cord 12 in the self-supporting electric power cable 2. Thus, the at least one supporting cord 12 is subjected to larger tensional strain than the number of individual wires 14. Thus, the self-supporting electric power cable 2 is able to endure movements caused by waves without early cable failure due to fatigue in the number of individual wires 14.

Figures 4A, 4B:
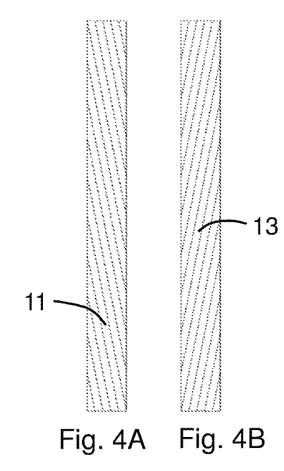
Figure 4C:
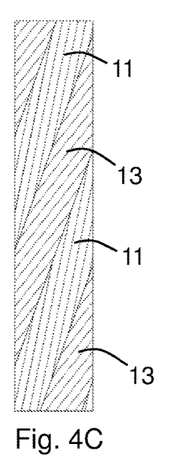

In FIGS. 4A-4C the above discussed lengthening of the individual wires is schematically illustrated with conductors 11 and supporting cords 13. The conductors 11 and supporting cords 13 are shown without sleeves to reveal the lay directions and lay lengths thereof. In FIG. 4A a conductor 11 is illustrated with individual wires or bundles of wires arranged in a first lay direction and having a first lay length. In FIG. 4B a supporting cord 13 is illustrated with its fibres or bundles of fibres arranged in a second lay direction and having a second lay length. In FIG. 4C conductors 11 and supporting cords 13 are arranged in the second lay direction. Due to the conductors 11 and supporting cords 13 being arranged in the second lay direction, the first lay length is increased and the second lay length is reduced, as is clearly visible in FIG. 4C. The reduction in second lay length and increase in first lay length means that the conductors 11 and their individual wires are lengthened in comparison with the supporting cords 13. This also means that the supporting cords 13 are shortened in comparison with the conductors 11 and their individual wires.

The self-supporting electric power cable 2 comprises at least two insulated conductors 10 having a substantially circular cross section and at least two supporting cords 12. Each of the at least two insulated conductors 10 abuts against at least one of the at least two insulated conductors 10, and each of the at least two supporting cords 12 abuts against at least two of the at least two insulated conductors 12. In this manner the at least two insulated conductors 10 and the at least two supporting cords 12 are arranged such that the strain on the self-supporting electric power cable 2 is mainly taken up by the at least two supporting cords 12.

The at least two supporting cords 12 are arranged immediately inside the outer jacket 6, i.e. the at least two supporting cords 12 abut against the outer jacket 6.

In these embodiments the self-supporting electric power cable 2 comprises three insulated conductors 10 having a substantially circular cross section and three supporting cords 12.

According to some embodiments, the outer jacket portion 6 may comprise a polyolefin such as a thermoplastic elastomer having a thickness within a range of 1-8 mm, or within a range of 1.5-5 mm.

According to some embodiments, the outer jacket portion 6 may comprise a polyurethane material having a thickness within a range of 1-8 mm, or within a range of 1.5-5 mm. In this manner a durable outer jacket portion 6 may be provided, which will withstand salt water and repeated movements of the cable 2 caused by waves and motions of a buoy arrangement, to which the cable 2 is attached. The outer jacket portion 6 may comprise one layer.

According to some embodiments, the outer jacket portion 6 may comprise at least two layers 6', 6", as illustrated in a left-hand sector of the outer jacket portion 6 in FIG. 1B. The at least two layers 6', 6" abut against each other. In this manner friction between the at least two layers 6', 6" may dampen movements of the cable 2 thus, reducing the amplitude of movements of the cable 2 as well as number of movements of the cable 2.

According to some embodiments, the at least one insulated conductor may comprise a conductor sleeve 22 made from a polyolefin having a thickness within a range of 0.5-4 mm, or within a range of 1.5-3 mm.

According to some embodiments, the at least one insulated conductor may comprise a conductor sleeve 22 made from a thermoplastic elastomer having a thickness within a range of 0.5-4 mm, or within a range of 1.5-3 mm. In this manner a low friction conductor sleeve 22 may be provided, which contributes to the flexibility of the cable 2.

The thermoplastic elastomer may be e.g. a Polyester, a Polyether, or an Ethylene Vinyl Acetate.

According to some embodiments, a total cross sectional area of the number of individual wires 14 within the at least one insulated conductor 10 may be within a range of 10-240 mm$^2$, or within a range of 10-150 mm$^2$, or within a range of 20-100 mm$^2$.

According to some embodiments the at least one insulated conductor 10 may comprise a friction reducing coating applied to the number of individual wires 14, the friction reducing coating provides a lower coefficient of friction between the number of individual wires 14 than a coefficient of friction of a core material of the number of individual wires (14). Preferably, the friction reducing coating provides a lower coefficient of friction between the number of individual wires 14 than a coefficient of friction of between the number of individual wires (14) without the friction reducing coating. In this manner the flexibility of the at least one insulated conductor 10 may be improved, and thus, also the flexibility of the cable 2. The core material of the number of individual wires 14 may be e.g. copper or aluminium. The friction reducing coating may be e.g. tin, or silver, or zinc, or led, i.e. a metal, which in a melted form is brought to coat the core material of the individual wires 14. According to further embodiments, the friction reducing coating may be a liquid such as an oil, or a silicone oil, without or with additives such as e.g. graphite. According to further embodiments, the friction reducing coating may be a powder, such as e.g. a graphite containing powder.

According to some embodiments, each of the number of individual wires 14 may have a diameter within a range of 0.05-0.6 mm, or within a range of 0.1-0.4 mm.

In this manner a flexible insulated conductor 10 may be provided, and thus, also a flexible electric power cable 2 may be provided.

The arrangement of the individual wires 14 in the insulated conductor 10 will be discussed in the following. For the purpose of the following discussion, two different types of insulated conductors 10', 10" are illustrated in the cable 2 of FIG. 1A. In practice, it is more likely that all insulated conductors 10 of a cable 2 comprise individual wires 14 arranged in the same manner.

According to some embodiments, the number of individual wires 14 are arranged in at least two bundles 18 in the insulated conductor 10'. The individual wires 14 of each bundle 18 are arranged in the first lay direction, and the at least two bundles 18 are arranged in the first lay direction. Accordingly, the at least one insulated conductor 10' may be built up of a number of bundles 18 of individual wires 14.

According to some embodiments, the at least one insulated conductor 10 comprises a conductor sleeve 22 enclosing the at least two bundles 18 in a lengthwise direction of the at least one insulated conductor 10', the individual wires 14 in the at least one insulated conductor 10' have an average excess length of more than 0.1%, in comparison with a length of the conductor sleeve 22. In this manner the individual wires 14 are relieved of the stress, to which the cable 2 is subjected. Namely, due to the average excess length of at least 0.1%, the at least one supporting cord 12 is subjected to tensile loads in the power cable 2 before the at least one insulated conductor 10 is subjected to tensile loads. The arranging of the at least one insulated conductor 10 and the at least one supporting cord 12 in the second lay direction create the average excess length.

When the at least one insulated conductor 10 and the at least one supporting cord 12 are laid in the second lay direction, the individual wires 14 within an insulated conductor 10 are unwound to a certain degree. The individual wires 14 at an outer periphery of the insulated conductor 10 are unwound to a higher degree than the individual wires 14 arranged centrally within the insulated conductor 10. Herein the term "average excess length" refers to a mean excess length of all individual wires 14 within one insulated conductor 10. Since the insulated conductor has an approximately circular cross section, at approximately 70% of the radius of the insulated conductor the individual wires 14 actually have the average excess length. At a smaller radius the individual wires 14 have a smaller excess length, and at a larger radius the individual wires 14 have a larger excess length.

The average excess length may be theoretically calculated in the manner explained in connection with Tables 1-3 below, which disclose calculation of excess length, or deficit length, after a second twist. In practice the average excess length will be somewhat lower and the deficit length will be somewhat longer due to the physical properties of the insulated conductor and the supporting cord.

TABLE 1

| | Fomula: Pitch loss in % Conductor or Supporting Cord | | | |
|---|---|---|---|---|
| put | Short text | Example | | Unit |
| ⌀ Strand (conductor or supporting cord) | ⌀str | 9.4 | | Mm |
| Lay length (or Pitch) | LL | 100 | | Mm |
| Calculation | Short text | Formula | Result | Unit |
| ⌀ average (equal share of material outside as inside this ⌀) | ⌀avr | ⌀avr = (SQRT(2)/2) × ⌀str | 6.65 | mm |
| Perimeter ⌀avr) | per⌀avr | per⌀avr = ⌀avr × PI | 20.88 | mm |
| Pitch loss | PL | PL = (SQRT(per⌀avr$^2$ + LL$^2$))/LL | 1.0216 | times |
| Pitch loss in % Conductor (or supporting cord) | PL%C | PL% = (PL − 1) × 100 | 2.16 | % |

TABLE 2

| | Fomula: New Pitch on First Twist after Additional Twisting | | | |
|---|---|---|---|---|
| Input | Short text | Example | | Unit |
| Lay length or Pitch second twist | LL2 | 400 | | Mm |
| Calculation | Short text | Formula | Unit | Unit |
| New Pitch on first twist after second twist (if different directions) | NPDD | NPDD = LL2/ ((LL2/LL) − 1) | 133.33 | Mm |
| New Pitch on first twist after second twist (if same direction) | NPSD | NPSD = LL2/ ((LL2/LL) + 1) | 80.00 | Mm |

TABLE 3

| | Fomula: Excess Length Conductor or Deficit Length Supporting Cord | | | |
|---|---|---|---|---|
| Input | Short text | Example | | Unit |
| ⌀ strand | ⌀str | 9.4 | | Mm |
| New Pitch on first twist after second twist (Different directions) | NPDD | 133.33 | | Mm |
| Calculation | Short text | Formula | Result | Unit |
| ⌀ average | ⌀avr | ⌀avr = (SQRT(2)/2) × ⌀str | 6.65 | mm |
| Perimeter ⌀avr | per⌀avr | per⌀avr = ⌀avr × PI | 20.88 | mm |
| Pitch loss conductor second twist | PLC2 | PLC2 = (SQRT(per⌀avr$^2$ + LL$^2$))/LL | 1.0122 | times |
| Pitch loss in % Conductor after second twist | PL%C2 | PL%C2 = (PLC2 − 1) × 100 | 1.22 | % |
| Excess Length Conductor | ELC | ELC = PL% − PL%C2 | 0.94 | % |

The formula Excess Length Conductor can also be used to calculate deficit length on the supporting cord. Then use the properties of the supporting cord instead of the conductor. Note that in such case NPSD shall be used instead of NPDD in the formula Excess Length Conductor to calculate Deficit Length Supporting Cord.

The bundles 18 are arranged in the first lay direction. In each bundle 18 the individual wires 14 may be arranged in the first lay direction, or in the second lay direction, or they may extend longitudinally along the relevant bundle 18, i.e. arranged with no lay. Since the insulated conductor 10 is arranged in the second lay direction with the supporting cord 12, the average excess length of the individual wires 14, as discussed above, is provided and the reduction tensile load is provided.

According to some embodiments, the number of individual wires of each of the at least two bundles 18 may have a lay length of at least twice a diameter of one of the at least two bundles 18. The at least two bundles may have a lay length of at least twice a diameter of the at least one insulated conductor and less than 100 times the diameter of the at least one insulated conductor 10. The at least one insulted conductor 10 and the at least one supporting cord 12 may have a lay length of at least twice a diameter of the self-supporting electric power cable 2 and less than 100 times the diameter of the self-supporting electric power cable 2.

According to some embodiments, the number of individual wires of each of the at least two bundles 18 may have a lay length of at least 15 times a diameter of one of the at least two bundles 18 and less than 30 times the diameter of one of the at least two bundles 18. The at least two bundles may have a lay length of at least 8 times a diameter of the at least one insulated conductor and less than 20 times the diameter of the at least one insulated conductor 10. The at least one insulted conductor 10 and the at least one supporting cord 12 may have a lay length of at least 6 times a diameter of the self-supporting electric power cable 2 and less than 20 times the diameter of the self-supporting electric power cable 2.

According to alternative embodiments, the number of individual wires 14 may be arranged in one bundle 20 only in the at least one insulated conductor 10″. In such embodiments having only one bundle 20 in the at least one insulated conductor 10" the individual wires 14 of the one bundle 20 may have a lay length of at least twice a diameter of the insulated conductor and less than 100 times a diameter of the at least one insulated conductor 10, or less than 20 times a diameter of the at least one insulated conductor 10.

Now, the at least one supporting cord 12 will be discussed in more detail. The synthetic fibres 16 may be arranged without any lay, i.e. extending substantially longitudinally along an extension of the supporting cord 12. The synthetic fibres 16 may be arranged in one bundle only in the supporting cord 12. Alternatively, the synthetic fibres 16 may be arranged in more than one bundle in the supporting cord 12. The synthetic fibres 16 are arranged in the at least one supporting cord 12 in a manner such that the at last one supporting cord is not elongated, or at least elongated less than, the individual wires 14 of the at least one insulated conductor 10 when the at least one insulated conductor 10 and the at least one supporting cord 12 are arranged in the second lay direction in the electric power cable 2.

The at least one supporting cord 12 is fairly rigid along its longitudinal extension, i.e. the at least one supporting cord 12 is substantially inflexible along its longitudinal extension, at least under the loads the cable 2 is subjected to in use. However, bending flexibility of the at least one supporting cord 12 is high. Also, the at least one supporting cord 12 is flexible as to its cross sectional shape. That is, the at least one supporting cord 12 will adapt its shape to a certain extent in the cable 2. The at least one supporting cord 12 may be manufactured with a substantially round cross section. Under compressive load under the outer jacket 6 in the cable 2, the cross sectional shape of the at least one supporting cord 12 is altered, e.g. to a shape as illustrated in FIG. 1B. Thus, the synthetic fibres 16 are sufficiently loosely arranged in the at least one supporting cord 12 to permit the altering of the cross sectional shape.

The at least one supporting cord 12 may comprise a flexible braided sleeve 24 enclosing the synthetic fibres 16. The flexible braided sleeve 24 may comprise synthetic fibres, such as e.g. polyester fibres.

Mentioned purely as an example, a self-supporting electric power cable 2 for subsea use and provided for a voltage of up to 3 kV at 525 kW may comprise three insulated conductors 10 each having a substantially circular cross sectional area of approximately 50 mm2 and three supporting cords 12 having a diameter of approximately 8 mm. The cable 2 may have a diameter of approximately 40 mm. In each insulate conductor 10 the number of individual wires 14 may be arranged in 18 bundles 18 having a lay length within a range of 40-60 mm, e.g. approximately 50 mm. Each bundle 18 may have diameter of approximately 2 mm. The 18 bundles 18 may have a lay length within a range of 80-120 mm, e.g. approximately 100 mm in the insulate conductor 10. The insulated conductor 10 may have a diameter of approximately 10 mm. The three insulted conductors 10 and the three supporting cords 12 may have a lay length within a range of 350-450 mm, e.g. approximately 400 mm in the cable 2. The synthetic fibres 16 may comprise aramid fibres and may be arranged in one bundle only in the supporting cord 12 and may have a lay length within a range of 15-45 mm, e.g. approximately 30 mm. An average excess length of the number of individual wires 14 may be approximately 0.9% calculated as discussed above.

Figure 2:
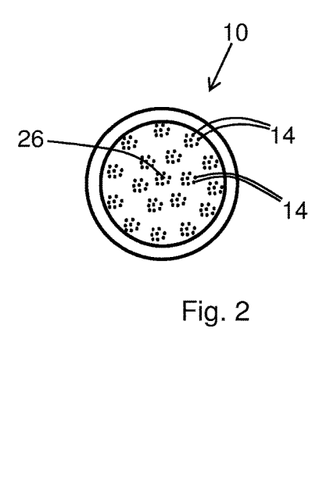

FIG. 2 schematically illustrates a cross section through an insulated conductor 10 according to embodiments. The insulated conductor 10 may form an insulated conductor 10 of a self-supporting electric power cable as discussed herein.

The insulated conductor 10 comprises a centrally arranged bundle 26 of synthetic fibres arranged in the middle of a number of individual wires 14. Again, the individual wires 14 form a conductive portion of the insulated conductor 10, and of a relevant cable. Again, the individual wires 14 may be arranged in one bundle only or in a number of bundles. Again the individual wires 1 are arranged in the first lay direction. The bundle 26 of synthetic fibres reinforces the insulated conductor 10 in its lengthwise direction. As discussed above, the individual wires 14 of an insulated conductor 10 are lengthened less towards a centre of the insulated conductor 10 as the insulated conductor 10 is twisted together with a supporting cord in the second lay direction during manufacturing of the cable. Thus, the bundle 26 of synthetic fibres provides a rigid centre of the insulated conductor 10, where the strain in the insulated conductor 10 could be the highest during movement of the cable.

According to embodiments, the synthetic fibres in the bundle 26 of synthetic fibres either extend longitudinally along the insulated conductor 10 or are arranged in the second lay direction, or are arranged in the first lay direction at a lesser lay length than a lay length of the number of individual wires 14. In this manner the bundle 26 of synthetic fibres is shortened in comparison with the individual wires 14 as the insulated conductor 10 is laid in the second lay direction together with a supporting cord in a relevant cable.

The synthetic fibres may e.g. comprise aramid fibres, sold inter alia under the name Kevlar™, and/or Ultra-high-molecular-weight polyethylene, UHMWPE, UHMW, also known as high-modulus polyethylene, HMPE, or high-performance polyethylene HPPE, sold inter alia under the name Dyneema™, and/or Poly Vinyl Alcohol, PVOH, PVA, or PVAI.

Figure 3:
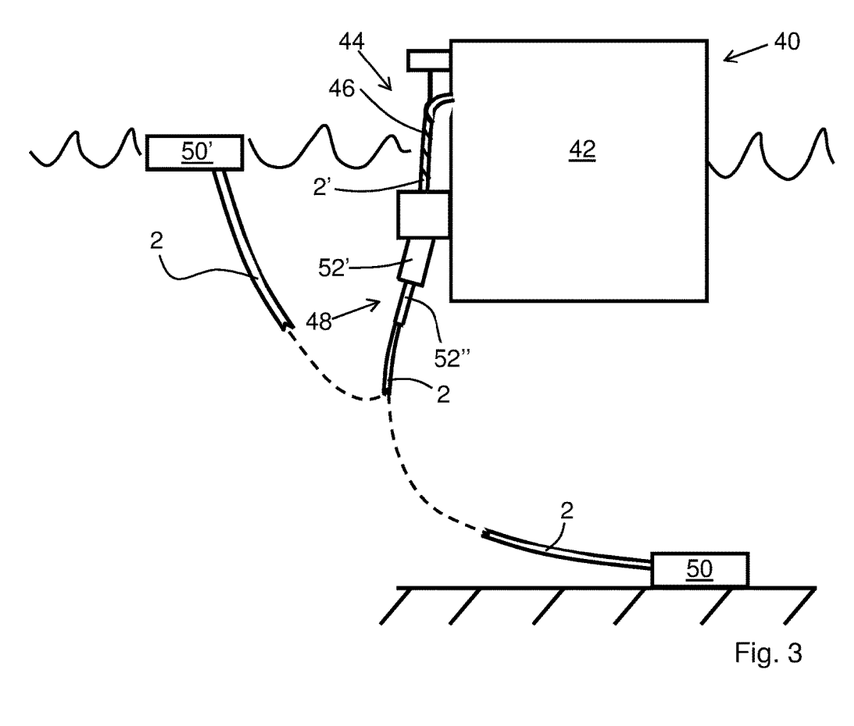

FIG. 3 schematically illustrates an offshore arrangement 40 according to embodiments. The offshore arrangement 40 may be an electric installation, such as e.g. a power generation station. As such it has to have an electric power cable connection. Also other types of electric installations may require connection with a power cable either for conducting electric power to the floating electric installation, or from the electric installation.

In these embodiments, the offshore arrangement 40 comprises a wave powered generator, which conducts generated electric power to a hub 50 at the bottom of the sea, or to a floating hub 50'. Other examples of electric generators are wind powered generators, current power generators or tidal water powered generators.

The offshore arrangement 40 comprises a movable body 42, a suspension arrangement 44 for a self-supporting power cable, and a self-supporting electric power cable 2 according to any one aspect and/or embodiment discussed herein. The movable body 42 may be move by waves of the sea, by sea currents, by tidal water, or combinations thereof. As such the power cable 2 is subjected to a large number of movements over time. A life expectancy of the power cable may be at least 10 years, at least 20 years, or even at least 30 years.

According to some embodiments a portion 2' of the self-supporting electric power cable 2 at the movable body 42 extends in a substantially vertical direction. The suspension arrangement 44 comprises one or more metal wires 46 twisted around part of the portion 2' of the self-supporting electric power cable 2 extending in a substantially vertical direction, such that a region of the self-supporting electric power cable 2 being partially enclosed by the one or more twisted wires 46 is subjected to radially inwardly directed forces from the one or more twisted wires 46. More specifically, the weight of the cable 2 being suspended from the suspension arrangement 44 causes the one or more twisted wires 46 to tighten around the cable 2. The one or more twisted wires 46 may form a spiral, e.g. a dead end spiral as discussed in WO 2012/005638. The one or more twisted wires 46 are suitably twisted in the second lay direction, i.e. the same lay direction as the at least one insulated conductor and the at least one supporting cord are twisted in, in the cable 2. The one or more twisted wires 46 may have a pitch substantially corresponding to the lay length of the at least one insulated conductor and the at least one supporting cord in the cable 2. According to some embodiments, the one or more twisted wires 46 may have a shorter pitch than the lay length of the at least one insulated conductor and the at least one supporting cord in the cable 2. For instance, the pitch may be 150-350 mm when the lay length is approximately 400 mm, or the pitch may be within a range of 30-90% of the lay length. The suspension arrangement 44 is either directly, or indirectly, attached to the movable body 42.

The hub 50 at the bottom of the sea may be a transformer hub. The hub 50 at the bottom of the sea may be connected to more than one electric installation. The hub 50 at the bottom of the sea may be connected to further hubs at the bottom of the sea and/or on land.

The floating hub 50' may be a transformer hub. The floating hub 50' may be connected to more than one electric installation. The floating hub 50' may be connected to further floating hubs, and/or hubs at the bottom of the sea, and/or hubs on land. The floating hub 50' may be anchored (not shown) to the bottom of the sea or any other support structure in order to not float away form a specific area.

From its substantially vertical position along the movable body 42, the cable 2 extends freely to the hub 50, 50'. The cable 2 will thus be subjected to movements as the movable body 42 is moved by waves of the sea, by tidal water, by winds, by currents, etc.

At a transition between the substantially vertical position and the free portion of the cable 2, the cable 2 may be subjected to comparatively sharp bending, which may cause the cable 2 to fail. Thus, according to some embodiments, the offshore arrangement 40 may comprise a cover arrangement 48 extending substantially around the self-supporting electric power cable 2 and having an extension along the longitudinal direction of the self-supporting electric power cable 2. The cover arrangement 2 may be positioned beneath the suspension arrangement 44. The cover arrangement 48 may engage frictionally with the outer jacket portion, and the cover arrangement 48 may comprise at least two portions 52', 52" having different diameters. Thus, the cable 2 is locally enforced to cause a gradual bending of the cable 2 as it transits from the substantially vertical portion 2' to the free portion thereof. Suitably, a smaller diameter portion 52" of the cover arrangement 48 is arranged closest to the free portion of the cable 2 and a larger diameter portion 52' of the cover arrangement 48 is arranged above the smaller diameter portion 52". The cover arrangement 48 may be made form a flexible material such as rubber, polyurethane, EPDM, or other suitable material. The cover arrangement 48 may be a bending reduction arrangement according to the Swedish patent application SE 1530182-3 filed 2015 Dec. 1 by the applicant W4P Waves 4 Power AB.

At an end portion of the power cable 2 at the movable body 42 the at least one supporting cord of the electric power cable 2 may be exposed and separately secured to prevent the at least one supporting cord from sliding into the electric power cable 2 and loosing part of its tension relieving function in relation to the at least one insulated conductor of the electric power cable 2. The at least one supporting cord may be secured to the suspension arrangement 44, or to the movable body 42. A further alternative, in embodiments where the electric power cable 2 comprises more than one supporting cord, the supporting cords may be tied together above the one or more metal wires 46 of the suspension arrangement.

The movable body 42 may be anchored (not shown) to the bottom of the sea or any other support structure in order to not float away form a specific area. Mentioned purely as an example, in practice the cable 2 may have a length of approximately 150 m and may have a weight of approximately 300 kg.

The power cable 2 may be attached to the floating hub 50' in the same manner as to the movable body 42 of the offshore arrangement 40.

The movable body 42 may be a floating body such as a buoy, or other body deployed in the sea above the bottom of the sea due to buoyancy, or currents, or wave action.

It is to be understood that the foregoing is illustrative of various example embodiments and that the invention is defined only by the appended claims. Since the electric power cable 2 and its various components do not have perfect circular cross sections, diameters discussed herein are average diameters. The power cable 2 may comprise further components than the outer jacket portion, the at least one insulated conductor, and the at least one supporting cord. A person skilled in the art will realize that the example embodiments may be modified, and that different features of the example embodiments may be combined to create embodiments other than those described herein, without departing from the scope of the present invention, as defined by the appended claims.

The invention claimed is:

1. A self-supporting electric power cable having a length defining a longitudinal direction and comprising an outer jacket portion and a core portion, wherein
   the outer jacket portion extends along the longitudinal direction and encloses the core portion, wherein
   the core portion includes at least one insulated conductor and at least one supporting cord, wherein
   the at least one insulated conductor includes a number of individual wires, and wherein
   the at least one supporting cord includes fibres, preferably selected from synthetic fibres, mineral fibres or a combination thereof,
wherein
   the number of individual wires, individually or arranged in bundles, are arranged in a first lay direction, wherein
   the at least one insulated conductor, and the at least one supporting cord are arranged in a second lay direction, the second lay direction being opposite to the first lay direction, and wherein
   the at least one supporting cord is arranged as a separate unit in a cross sectional sector of the self-supporting electric power cable.

2. The self-supporting electric power cable according to claim 1, wherein the number of individual wires are arranged in at least two bundles in the at least one insulated conductor, and wherein
   the at least two bundles are arranged in the first lay direction.

3. The self-supporting electric power cable according to claim 2, wherein the number of individual wires of each of the at least two bundles have a lay length of at least twice a diameter of one of the at least two bundles, wherein the at least two bundles have a lay length of at least twice a diameter of the at least one insulated conductor, and less than 100 times the diameter of the at least one insulated conductor, and wherein the at least one insulted conductor and the at least one supporting cord have a lay length of at least twice a diameter of the self-supporting electric power cable and less than 100 times the diameter of the self-supporting electric power cable.

4. The self-supporting electric power cable according to claim 3, wherein the at least one insulated conductor includes a conductor sleeve enclosing the at least two bundles), and wherein the individual wires of the at least one insulated conductor have an average excess length of more than 0.1%, in comparison with a length of the conductor sleeve.

5. The self-supporting electric power cable according to claim 2, wherein the at least one insulated conductor, includes conductor sleeve enclosing the at least two bundles, and wherein the individual wires of the at least one insulated conductor have an average excess length of more than 0.1%, in comparison with a length of the conductor sleeve.

6. The self-supporting electric power cable according to claim 2, wherein the at least one insulated conductor includes a friction reducing coating applied to the number of individual wires, the friction reducing coating providing a lower coefficient of friction between the number of individual wires than a coefficient of friction of a core material of the number of individual wires.

7. The self-supporting electric power cable according to claim 2, wherein each of the number of individual wires has a diameter within a range of 0.05-0.6 mm, or within a range of 0.1-0.4 mm.

8. The self-supporting electric power cable according to claim 2, wherein the at least one insulated conductor includes a conductor sleeve made from a thermoplastic elastomer having a thickness within a range of 0.5-4 mm, or within a range of 1.5-3 mm.

9. The self-supporting electric power cable according to claim 2, wherein the outer jacket portion includes a polyurethane material having a thickness within a range of 1-8 mm, or within a range of 1.5-5 mm.

10. The self-supporting electric power cable according to claim 1, wherein the number of individual wires are arranged in one bundles only in the at least one insulated conductor, the number of individual wires being arranged in the first lay direction.

11. The self-supporting electric power cable according to claim 1, wherein the at least one insulated conductor includes a friction reducing coating applied to the number of individual wires, the friction reducing coating providing a lower coefficient of friction between the number of individual wires than a coefficient of friction of a core material of the number of individual wires.

12. The self-supporting electric power cable according to claim 1, wherein each of the number of individual wires has a diameter within a range of 0.05-0.6 mm, or within a range of 0.1-0.4 mm.

13. The self-supporting electric power cable according to claim 1, wherein the at least one insulated conductor includes a conductor sleeve made from a thermoplastic elastomer having a thickness within a range of 0.5-4 mm, or within a range of 1.5-3 mm.

14. The self-supporting electric power cable according to claim 1, wherein the outer jacket portion includes a polyurethane material having a thickness within a range of 1-8 mm, or within a range of 1.5-5 mm.

15. The self-supporting electric power cable according to claim 1, includes at least two insulated conductors having a substantially circular cross section and at least two supporting cords, wherein each of the at least two insulated conductors abuts against at least one other of the at least two insulated conductors, and wherein each of the at least two supporting cords abuts against at least two of the at least two insulated conductors.

16. The self-supporting electric power cable according to claim 1, wherein the at least one insulated conductor includes a centrally arranged bundle of fibres surrounded by at least some of the number of individual wires, the fibres are preferably selected from synthetic fibres, mineral fibres or a combination thereof.

17. The self-supporting electric power cable according to claim 16, wherein the centrally arranged fibres in the bundle of fibres either extend with substantially no lay along the at least one insulated conductor, or are arranged in the second lay direction, or are arranged in the first lay direction at a lesser lay length than a lay length of the number of individual wires surrounding the bundle.

18. An offshore arrangement including a movable body, a suspension arrangement for a self-supporting electric power cable, and a self-supporting electric power cable according to claim 1.

19. The offshore arrangement according to claim 18, wherein a portion of the self-supporting electric power cable at the movable body extends in a substantially vertical direction, and wherein the suspension arrangement includes one or more metal wires twisted around the portion of the self-supporting electric power cable extending in a substantially vertical direction, such that a region of the self-supporting electric power cable being partially enclosed by the one or more twisted wires is subjected to radially inwardly directed forces from the one or more twisted wires.

20. The offshore arrangement according to claim 19, including a cover arrangement extending substantially around the self-supporting electric power cable and having an extension along the longitudinal direction of the self-supporting electric power cable, wherein the cover arrangement is positioned beneath the suspension arrangement, wherein the cover arrangement engages frictionally with the outer jacket portion, and wherein the cover arrangement includes at least two portions having different diameters.

* * * * *